United States Patent
Schumacher

(10) Patent No.: US 8,818,289 B2
(45) Date of Patent: Aug. 26, 2014

(54) METHOD AND SYSTEM FOR MEASURING MOBILE STATIONS IN COMMUNICATIONS NETWORKS WITH VIRTUAL ANTENNA ARRAYS

(75) Inventor: Adrian Schumacher, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 223 days.

(21) Appl. No.: 13/522,286

(22) PCT Filed: Dec. 7, 2010

(86) PCT No.: PCT/EP2010/007436
§ 371 (c)(1),
(2), (4) Date: Jul. 13, 2012

(87) PCT Pub. No.: WO2011/085759
PCT Pub. Date: Jul. 21, 2011

(65) Prior Publication Data
US 2012/0302175 A1    Nov. 29, 2012

(30) Foreign Application Priority Data

Jan. 14, 2010  (DE) .......................... 10 2010 004 575
Mar. 22, 2010  (DE) .......................... 10 2010 012 285

(51) Int. Cl.
*H04B 17/00*    (2006.01)

(52) U.S. Cl.
USPC .................. 455/67.11; 455/67.14; 455/115.1; 455/115.2; 715/725

(58) Field of Classification Search
USPC .......... 455/67.11, 67.14, 115.1, 115.2, 226.1, 455/423, 424; 715/725
See application file for complete search history.

(56) References Cited

U.S. PATENT DOCUMENTS

| | | | |
|---|---|---|---|
| 6,545,690 B1 * | 4/2003 | Hernandez, III | 715/762 |
| 6,805,293 B2 * | 10/2004 | Lee et al. | 235/454 |
| 7,215,969 B2 * | 5/2007 | Benco et al. | 455/456.6 |
| 7,224,968 B2 * | 5/2007 | Dobson et al. | 455/423 |
| 7,343,558 B2 * | 3/2008 | Kadota | 715/725 |

(Continued)

FOREIGN PATENT DOCUMENTS

GB    2440190 A    1/2008

OTHER PUBLICATIONS

International Search Report mailed Apr. 18, 2011, issued in corresponding International Application No. PCT/EP2010/007436, filed Dec. 7, 2010, 2 pages.

(Continued)

*Primary Examiner* — Minh D Dao
(74) *Attorney, Agent, or Firm* — Christensen O'Connor Johnson Kindness PLLC

(57) ABSTRACT

A measuring device for measuring a device under test comprises a first subscriber, a second subscriber, a first virtual antenna array and a processing device. The device under test in this context is a mobile station. The first virtual antenna array comprises at least two mobile stations. The first virtual antenna array contains the device under test. The first subscriber is arranged in such a manner that it transmits signals to the first virtual antenna array. The first virtual antenna array in this context is arranged in such a manner that it transmits signals at least indirectly to the second subscriber. The processing device is designed in such a manner that it compares signals transmitted to the device under test and transmitted from the device under test.

23 Claims, 8 Drawing Sheets

(56) References Cited

U.S. PATENT DOCUMENTS

| | | | |
|---|---|---|---|
| 7,594,010 B2 | 9/2009 | Dohler | |
| 7,636,322 B1* | 12/2009 | Gandhi et al. | 370/252 |
| 7,792,032 B2* | 9/2010 | Dobson et al. | 370/232 |
| 8,107,949 B1* | 1/2012 | Wang | 455/423 |
| 8,547,910 B2* | 10/2013 | Chakrabarti et al. | 370/329 |
| 2003/0121977 A1* | 7/2003 | Lee et al. | 235/454 |
| 2006/0242504 A1* | 10/2006 | Kadota | 714/725 |
| 2007/0002763 A1 | 1/2007 | Hulyalkar | |
| 2007/0160014 A1 | 7/2007 | Larsson | |
| 2008/0003948 A1 | 1/2008 | Mitran | |
| 2008/0274692 A1 | 11/2008 | Larsson | |
| 2009/0116419 A1 | 5/2009 | Chong | |
| 2009/0215443 A1* | 8/2009 | Dickey et al. | 455/424 |
| 2009/0323640 A1* | 12/2009 | Chakrabarti et al. | 370/335 |
| 2012/0307765 A1* | 12/2012 | Chakrabarti et al. | 370/329 |
| 2012/0315949 A1* | 12/2012 | Zhang et al. | 455/525 |

OTHER PUBLICATIONS

International Preliminary Report on Patentability and Written Opinion mailed Aug. 16, 2012, issued in corresponding International Application No. PCT/EP2010/007436, filed Dec. 7, 2010, 7 pages.

* cited by examiner

METHOD AND SYSTEM FOR MEASURING MOBILE STATIONS IN COMMUNICATIONS NETWORKS WITH VIRTUAL ANTENNA ARRAYS

The invention relates to a measuring method and a measuring system for measuring mobile stations in communications networks which contain virtual antenna arrays.

In conventional communications networks, there is a direct communications link between a base station and a mobile station. In order to improve the transmission conditions, the use of multi-path propagation (diversity) is also known. Within the MIMO communications system, several antennas are used at the transmission end and at the reception end. However, the several antennas are each connected to an individual device, for example, of the base station or of the mobile station. In order to improve the transmission quality or to increase the range, the use of relay stations is also known. In this context, for example, a base station is connected to a relay station which is, in turn, connected to a mobile station.

However, with the communications systems described, it is disadvantageous that the range and the transmission quality depend upon the distribution of components, for example, base stations or relay stations, installed in a fixed manner.

In the relatively recent past, virtual antenna arrays have also been developed. A virtual antenna array comprises a plurality of independent mobile subscribers, which are connected together to form a network. Accordingly, each individual subscriber adopts the function of an antenna within a MIMO communications network. Within a communications network of this kind, a link from a base station to a mobile station can therefore be guided via such a virtual antenna array. The base station transmits a signal to all subscribers connected to a virtual antenna array. The subscribers of the virtual antenna array convert the signal and each transmit a signal which is received by the target mobile station. The individual subscribers of the virtual antenna array are conventional mobile stations, which are held by users. In this manner a significant increase in the range of the base station can be achieved, without the need for communications-network components installed in a fixed manner for this purpose.

Accordingly, U.S. Pat. No. 7,594,010 B2 discloses such a virtual antenna array. However, although virtual antenna arrays have been known since the recent past, there is still no measurement technology for measuring the subscribers of a virtual antenna array and the base stations and mobile stations connected to a virtual antenna array.

The invention is therefore based upon the object of providing a measuring system and a measuring method, which allows components of a virtual antenna array and subscribers connected to a virtual antenna array to be measured.

The object is achieved according to the invention for the system by the features of the independent claims 1 and 8 and for the method by the features of the independent claims 13 and 19. Advantageous further developments form the subject matter of the dependent claims relating back to these claims.

A measuring system according to the invention for measuring a device under test comprises a first subscriber, a second subscriber, a virtual antenna array and a processing device. The device under test in this context is a mobile station. The first virtual antenna array comprises at least two mobile stations. The first virtual antenna array here contains the device under test. The device under test is preferably one of the at least two mobile stations. Alternatively, it can be a part of the virtual antenna array as a further mobile station. The first subscriber is arranged in such a manner that it transmits signals to the first virtual antenna array. The first virtual antenna array is arranged in such a manner that it transmits signals to the second subscriber at least indirectly. The processing device is designed in such a manner that it compares signals transmitted to the device under test and transmitted from the device under test. Accordingly, a reliable monitoring of the functionality of the device under test as a part of virtual antenna array is possible.

The first subscriber is preferably a base station, while the second subscriber is preferably a mobile station. As an alternative, the first subscriber is preferably a mobile station, while the second subscriber is a base station. Accordingly, a monitoring of the capability of the device under test for communication with a base station and also with a mobile station is possible.

The first virtual antenna array is advantageously connected to a second virtual antenna array. The first virtual antenna array is advantageously arranged in such a manner that it transmits signals to the second virtual antenna array. The second virtual antenna array is advantageously arranged in such a manner that it transmits signals to the second subscriber. Accordingly, the capability of the device under test for communication with a second virtual antenna array can be monitored.

The first virtual antenna array and/or the second virtual antenna array are preferably designed in such a manner that an existing communications link from a virtual antenna array or from a subscriber to the device under test can be transferred to a further virtual antenna array or a further subscriber. The processing device preferably measures the behaviour of the device under test during the transfer. Accordingly, a monitoring of the capability of the device under test for the correct transfer of the link is possible.

The measuring system advantageously further comprises a channel-simulation device. The channel-simulation device preferably simulates an at least partially real transmission channel at least on one signal transmission path between two subscribers or between a virtual antenna array and one subscriber or between two virtual antenna arrays. Accordingly, a monitoring of the functionality of the device under test under real transmission conditions is possible.

The device under test is preferably reconfigured during an existing communications link from a component of the first virtual antenna array to a mobile station or base station which is not a component of a virtual antenna array. The processing device preferably measures during the reconfiguration of the behaviour of the device under text. Accordingly, a monitoring of the correct reconfigurability of the device under test is possible.

The device under test preferably comprises at least two antennas. The device under test preferably transmits or receives identical or different signals by means of its at least two antennas. The control device preferably monitors the reception or the transmission of the signals. Accordingly, a measurement of the capability of the device under test for the use of diversity is possible.

The measuring system according to the invention for measuring a device under test comprises a virtual antenna array and a processing device. The virtual antenna array comprises at least two mobile stations. The device under test is a mobile station or a base station. The virtual antenna array is arranged in such a manner that it transmits signals to the device under test and/or receives signals from the device under test. The processing device is embodied in such a manner that it compares signals transmitted to the device under test and transmitted from the device under test. Accordingly, a monitoring of the capability of the device under test for communicating with the virtual antenna array is possible.

In this context, the virtual antenna array is preferably designed in such a manner that it can transfer an existing communications link from a virtual antenna array or a subscriber to the device under test, to a further virtual antenna array or to a further subscriber. The processing device preferably measures the behaviour of the device under test during the transfer. In this manner, a monitoring of the capability of the device under test for the correct handling of link transfers is possible.

The device under test is advantageously reconfigured during an existing communications link from a mobile station or base station which is not a component of the virtual antenna array, into a component of a virtual antenna array. The processing device preferably measures the behaviour of the device under test during the reconfiguration. Accordingly, a monitoring of the capability of the device under test for correct reconfiguration is possible.

The invention is described by way of example below with reference to the drawings, which present an advantageous exemplary embodiment of the invention. The drawings are as follows.

Initially, the structure and functioning of the communications network, which contains a virtual antenna array, will be explained with reference to FIGS. 1-2. With reference to FIGS. 3-7, the structure and functioning of various exemplary embodiments of the measuring system according to the invention and respectively the measuring device according to the invention will then be illustrated. Finally, the functioning of an exemplary embodiment of the measuring method according to the invention will be presented with reference to FIG. 8. The presentation and description of identical elements in similar drawings has not been repeated in some cases.

Figure 1:
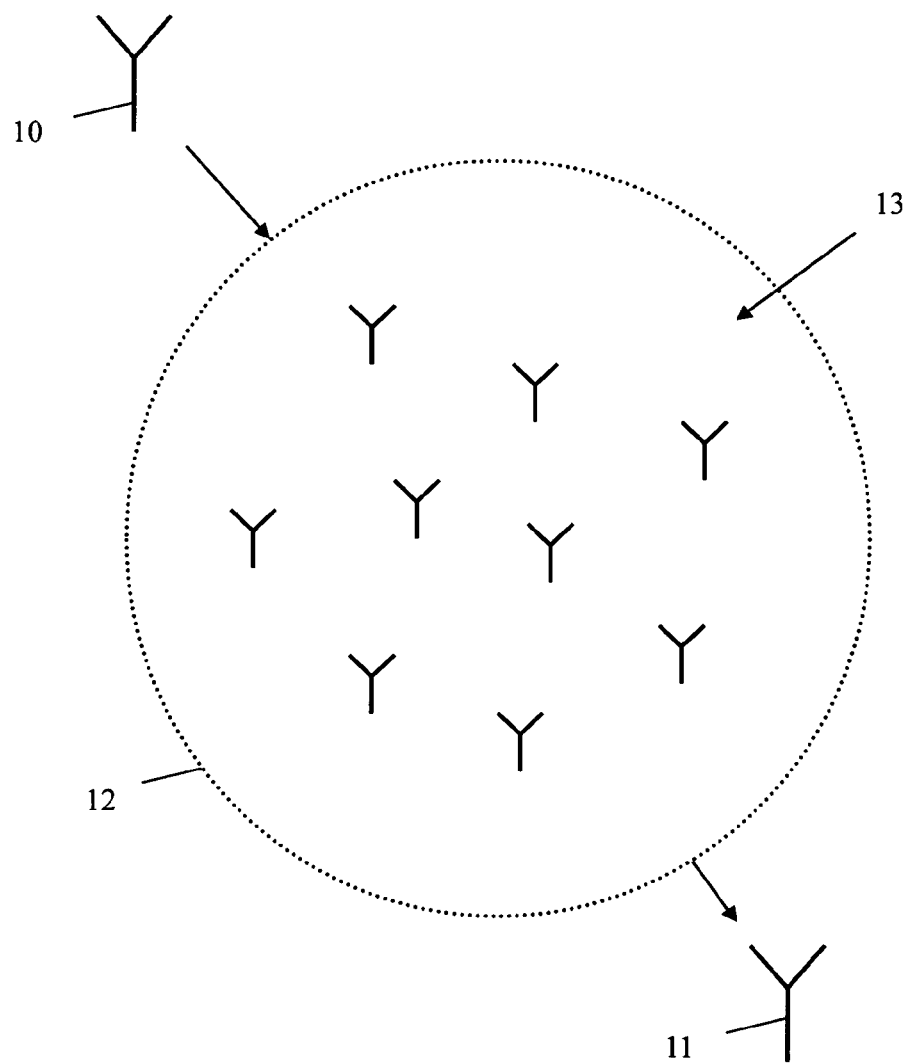
FIG. 1 shows a first exemplary communications network.

FIG. 1 shows a first exemplary communications system. A base station 10 seeks a communications link with a mobile station 11. However, under some circumstances, the base station 10 and the mobile station 11 are disposed outside their mutual range. In order to establish a communications link, the base station 10 sets up a communications link with a virtual antenna array 12. This virtual antenna array 12 comprises a plurality of mobile stations 13. The virtual antenna array 12 once again establishes a communications link with the mobile station 11.

The messages, which should be exchanged between the base station 10 and the mobile station 11, are accordingly guided via the virtual antenna array 12. The functioning of the virtual antenna array 12 will be descried in greater detail with reference to FIG. 2.

Figure 2:
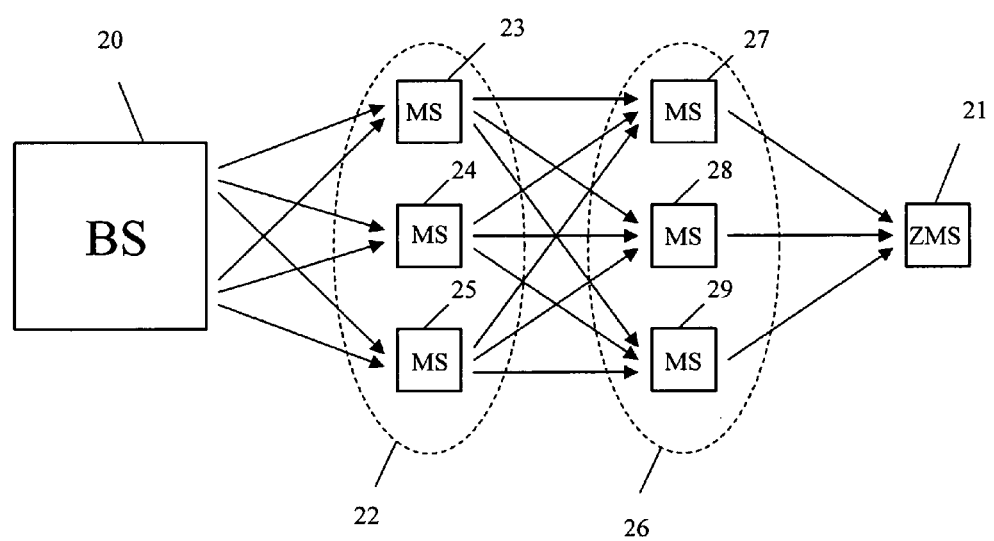
FIG. 2 shows a second exemplary communications network.

FIG. 2 shows a second exemplary communications system. A base station (BS) 20 seeks a connection with a target mobile station (MS) 21. However, they are not necessarily disposed within their mutual range. In order to transmit a message to the mobile station 21, the base station 20 transmits signals to a first virtual antenna array 22. The base station 20 illustrated here comprises two transmission antennas and accordingly transmits two different signals. It is therefore a MIMO base station. However, a base station with only one antenna or with more than two antennas can be used as an alternative.

The first virtual antenna array 22 in this context comprises a plurality of mobile stations 23, 24, 25. Each of the mobile stations 23, 24, 25 receives the two signals from the base station 20. Each of these mobile stations 23, 24, 25 can, once again, comprise one or more antennas. In the example illustrated here, each of the mobile stations 23, 24, 25 provides one antenna.

Since the target mobile station (ZMS) 21 is also not disposed within the range of the first virtual antenna array 22, the first virtual antenna array 22 transmits the messages to a second virtual antenna array 26. This second virtual antenna array 26 once again comprises a plurality of mobile stations 27, 28, 29. These mobile stations in this example also each comprise one antenna, but can also comprise two or more antennas.

Moreover, a different number of mobile stations is possible. Functioning is possible above a number of two mobile stations per virtual antenna array. The individual mobile stations 27, 28, 29 of the second virtual antenna array 26 receive the signals, convert them again and transmit them to the target mobile station 21.

A functioning in the reverse transmission direction is also possible. In this case, the mobile station 21 transmits a signal to the mobile stations 27, 28, 29, which are combined to form the virtual antenna array 26. The virtual antenna array 26 transmits the signal to the virtual antenna array 22, which transmits to the base station 20. The range of the base station 20 is therefore significantly increased, without requiring further network components installed in a fixed manner.

Figure 3:
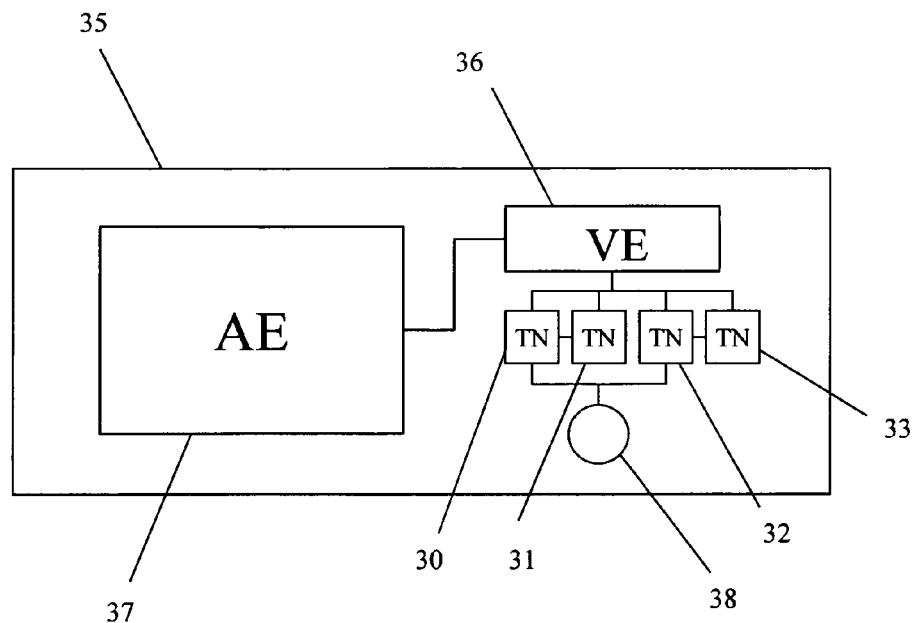
FIG. 3 shows a first exemplary embodiment of the measuring system according to the invention.

FIG. 3 shows a first exemplary embodiment of the measuring system according to the invention. A measuring device 35 contains a processing device 36, a display device (AE) 37, a connection 38 and a plurality of subscribers 30-33. The processing device (VE) 36 is connected to the display device 37, the connection 38 and all of the subscribers (TN) 30-33. Some of the subscribers are connected to the device under test and some to one another. In this context, the subscribers form the entire communications network to which the device under test is connected. The precise linking of the subscribers will be described in greater detail with reference to the following Figures.

The device under test to be investigated is connected to the connection 38. The processing device 36 controls the subscribers 30-33 in such a manner that the latter transmits signals via the connection 38 to the device under test and receives signals from the device under test. The processing device 36 compares the signals transmitted from the subscribers 30-33 to the device under test with the signals received by the subscribers 30-33 from the device under test.

As an alternative, the processing device 36 contains all of the components of the communications network to which the device under test would be connected in a real operation. In this case, the subscribers 30-33 are a part of the processing device.

The device under test in this context can be a subscriber associated with a virtual antenna array. In this case, the communications network contains the other subscribers of the virtual antenna array and at least two further subscribers not associated with the virtual antenna array. Accordingly, the capability of the device under test to operate as a part of a virtual antenna array is measured.

As an alternative, the device under test is a mobile station which is not a part of the virtual antenna array. In this application, the capability of the device under test to operate together with virtual antenna arrays is measured.

The precise functioning of the measurement is described in greater detail with reference to the following drawings. The result of the measurements is displayed by the processing device 36 on the display device 37.

Figure 4:
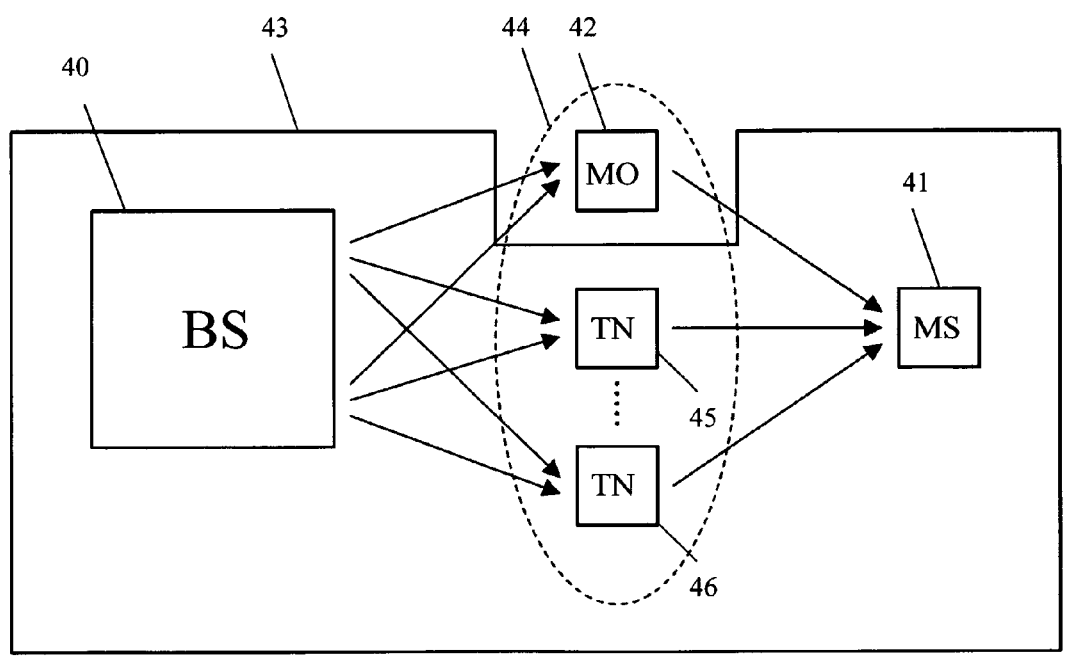
FIG. 4 shows a second exemplary embodiment of the measuring system according to the invention.

FIG. 4 shows a second exemplary embodiment of the measuring system according to the invention. Here, the first case illustrated is presented. That is to say, the device under test (MO) 42 is part of a virtual antenna array 44. The device under test 43 contains a base station 40, a mobile station 41 and several further subscribers 45, 46, which are part of the virtual antenna array 44. A use of only one further subscriber 45, which is associated with the virtual antenna array 44 is also conceivable. The virtual antenna array 44 then comprises only two subscribers. The subscribers 45, 46, the base station 40 and the mobile station 41 then correspond to the plurality of subscribers 30-33 from FIG. 3. The processing device 36, the display device 37 and the connection 38 from FIG. 3 are not illustrated here.

By means of its two antennas, the base station 40 transmits signals to the subscribers 42, 45, 46 of the virtual antenna array 44. The device under test 42 and the subscribers 45, 46 process the signals and transmit them further to the mobile station 41. The mobile station 41 receives the signals. The processing device explained with reference to FIG. 3 compares the signals transmitted from the base station 40 to the device under test with the signals received by the mobile station 41, which have been transmitted from the device under test 42. On the basis of this comparison, the processing device determines at least one criterion with reference to which the capability of the device under test 42 is evaluated. The determination of several criteria is also possible. These criteria can include, for example, the data throughput, the bit-error probability or the latency time. Further criteria can be the functionality of the multi-path transmission (MIMO) or the correctness of the overall signal stream.

As an option in order to achieve the most real, but defined transmission conditions possible on the individual transmission channels between the individual subscribers, channel-simulation devices can be additionally used. One such device is connected between each of the subscribers and simulates a real transmission channel. That is to say, fading and/or noise is added to the signal. A use is also possible on only one connection between subscribers or on several connections or on all connections.

Figure 5:
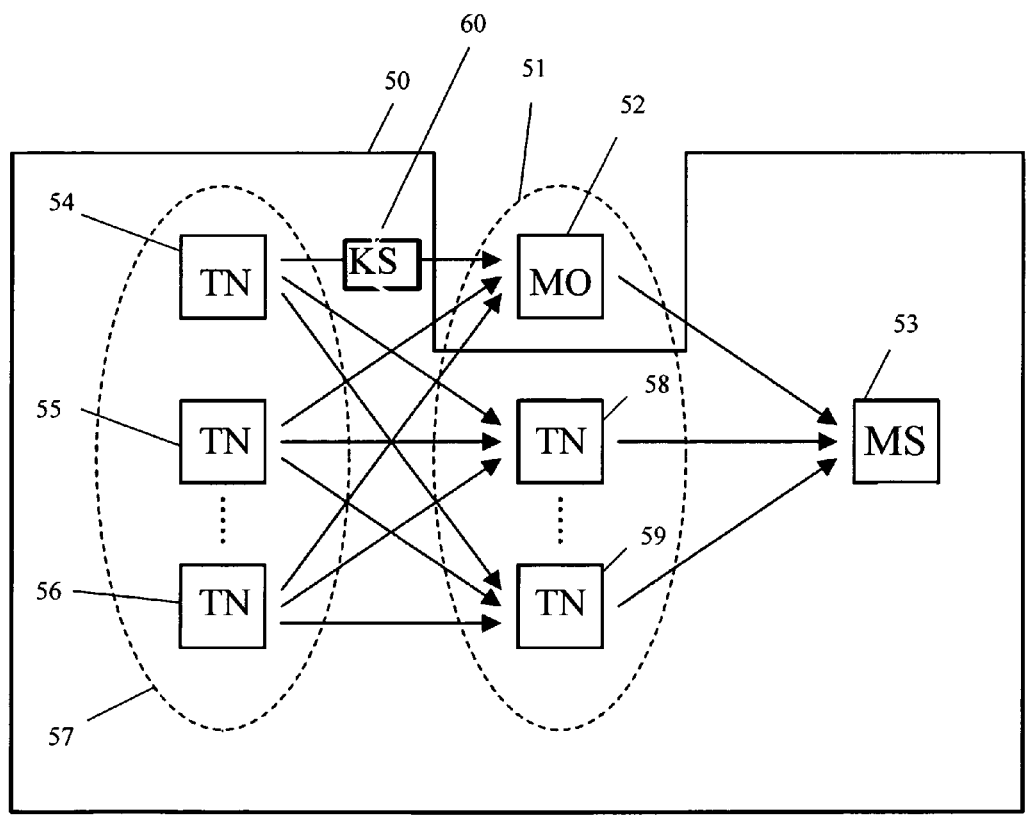
FIG. 5 shows a third exemplary embodiment of the measuring system according to the invention.

FIG. 5 shows a third exemplary embodiment of the measuring system according to the invention. The third exemplary embodiment corresponds to the part of the second exemplary embodiment from FIG. 4. A measuring device 50 contains part of a first virtual antenna array 51, which comprises the subscribers 58, 59. A further part of this first virtual antenna array 51 is the device under test 52. The measuring device 50 further contains a second virtual antenna array 57, which contains the subscribers 54, 55, 56. A different subscriber number of the individual virtual antenna arrays 51, 57 is also possible. A functioning as a virtual antenna array is possible above a subscriber number of more than two subscribers in each case.

In this exemplary embodiment, instead of a base station, the second virtual antenna array 57 transmits signals directly to the first virtual antenna array 51. In this context, each subscriber 54, 55, 56 of the second virtual antenna array 57 transmits an independent signal. The subscribers 52, 58, 59 of the first virtual antenna array 51 receive the signals and convert the latter. The transmission channel from the subscriber 54 to the device under test 52 is modified by a channel-simulation device (KS) 60, as explained with reference to FIG. 4. The signals are retransmitted by the subscribers 52, 58, 59 and received by a mobile station 53 also contained in the measuring device. The subscribers 54, 55, 56, 58, 59 and 53 correspond to the subscribers 30-33 from FIG. 3. The processing device 36, the display device 37 and the connection 38 are also not illustrated here.

The processing device, which is described in greater detail with reference to FIG. 3, compares the signals transmitted by the second virtual antenna array 57 with the signals received from the mobile station 53. On the basis of this comparison, at least one criterion is determined, with reference to which the capability of the device under test 52 as a part of the first virtual antenna array 51 is evaluated. As already explained with reference to FIG. 4, several such criteria can also be used.

In this exemplary embodiment also, the capability of the device under test to operate as a part of a virtual antenna array is monitored. As an option in order to achieve the most real but defined transmission conditions possible on the individual transmission channels between the individual subscribers, further channel-simulation devices can be additionally used here. Reference is made to the deliberations regarding FIG. 4.

Figure 6:
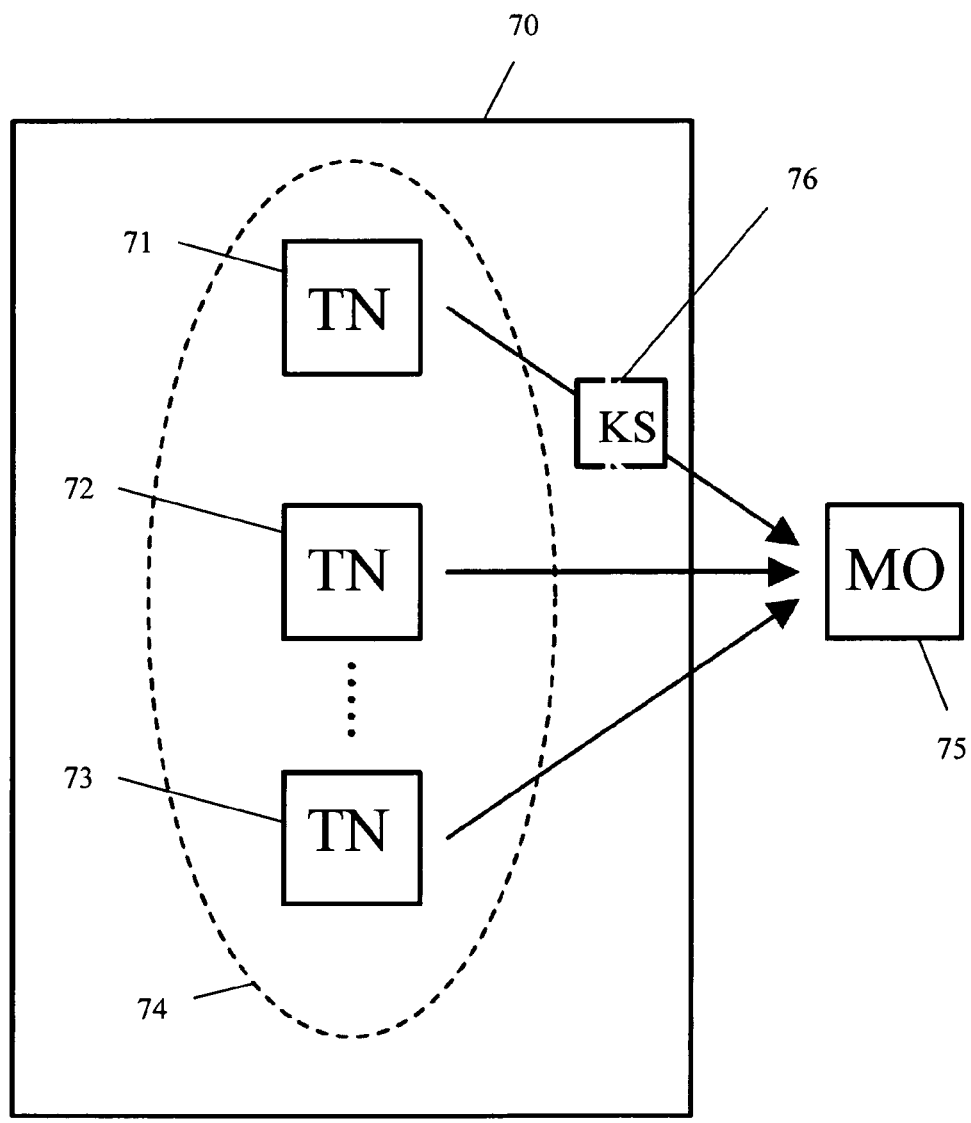
FIG. 6 shows a fourth exemplary embodiment of the measuring system according to the invention.

FIG. 6 shows a fourth exemplary embodiment of the measuring system according to the invention. In this exemplary embodiment, the capability of the device under test to operate together with a virtual antenna array is monitored. A measuring device 70 contains a first virtual antenna array 74, which contains the subscribers 71, 72, 73. A different subscriber number greater than 2 is also possible. The subscribers 71, 72, 73 in this context correspond to the subscribers 30-33 from FIG. 3. The processing device 36, the display device 37 and the connection 38 from FIG. 3 are also not presented here.

The device under test 75 is connected to the virtual antenna array 74. By contrast with the previous exemplary embodiments, it is not part of the virtual antenna array 74, but is merely disposed in a communications link with the latter. The device under test 75 is therefore the target mobile station, which is reached with the assistance of a virtual antenna array 74. As an alternative, the device under test 75 can be a base station.

In order to achieve the most real but defined transmission conditions possible, a channel-simulation device 76 is used here on the transmission channel from the subscriber 71 to the device under test 75. Regarding the function of the channel-simulation device 76, reference is made to the deliberations with regard to FIG. 4. Additional channel-simulation devices can optionally be used. A replacement of several independent channel-simulation devices with a common channel-simulation device which processes several signal paths, is also possible.

The virtual antenna array 74 is disposed in a communications link with the device under test 75. The processing device, which has already been described in greater detail with reference to FIG. 3, compares the signals transmitted from the virtual antenna array 74 to the device under test 75 with signals which are transmitted from the device under test 75. In order to achieve this, the device under test 75 is connected by means of an additional link not illustrated here, to the processing device. On the basis of this comparison, the processing device determines at least one criterion with reference to which the capability of the device under test 75 is evaluated. With regard to the design of the criteria, reference is made to the deliberations on FIGS. 3-5.

With each of the exemplary embodiments illustrated so far, static situations have been measured. That is to say, during the entire measurement, links exist between the same subscribers. However, in real applications, this is an unrealistic premise. In a real application, by contrast, all of the participating subscribers can move. Accordingly, the signal strengths and the propagation conditions vary. In particular, links with individual subscribers can drop out.

Figure 7:
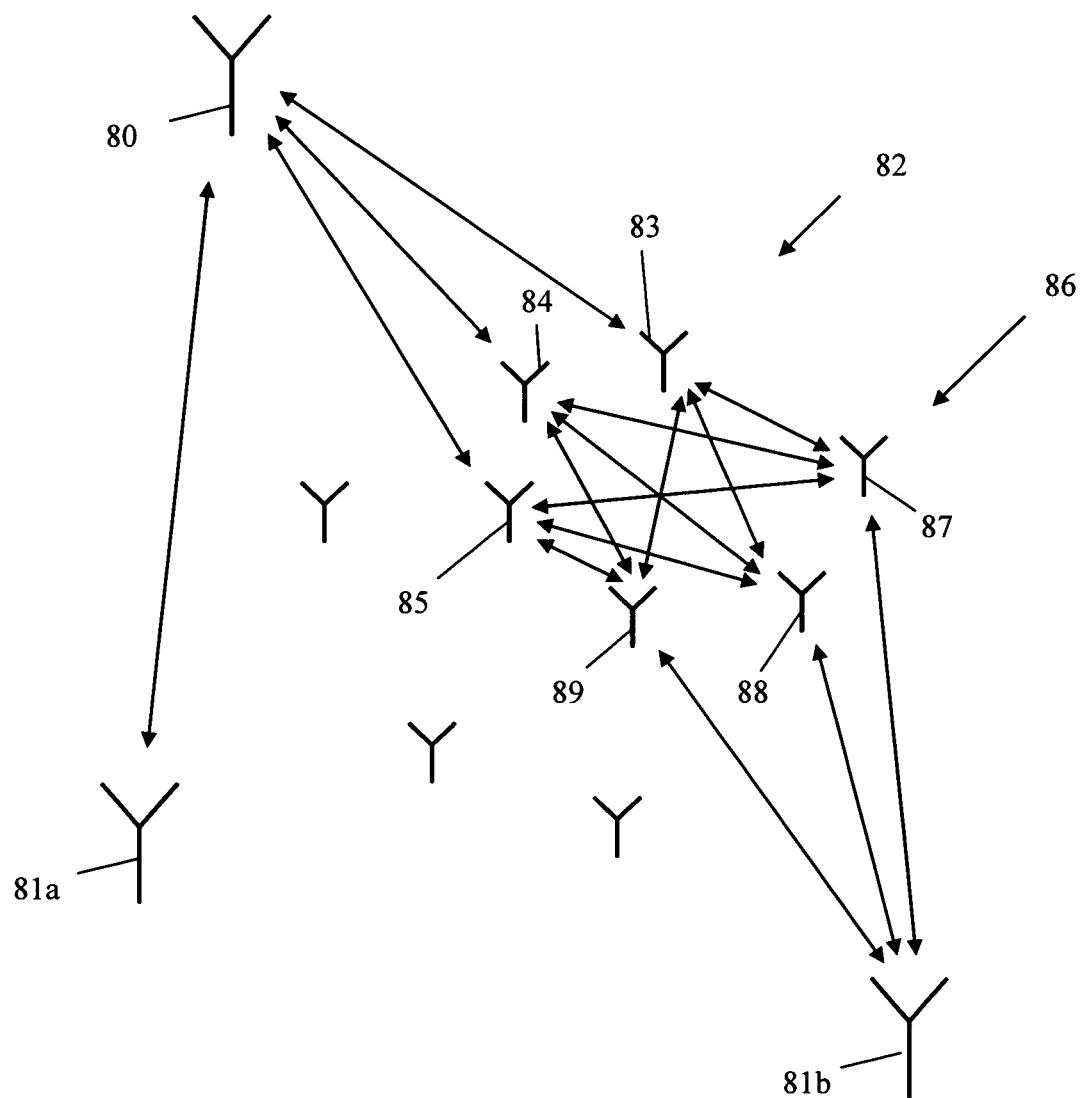
FIG. 7 shows a fifth exemplary embodiment of the measuring system according to the invention.

A fifth exemplary embodiment of the invention is illustrated with reference to FIG. 7. The application of a link transfer is taken into consideration here. A base station 80 is first linked on a direct path to a mobile station 81a. During the measurement, the mobile station 81a carries out a simulated movement and is now disposed as mobile station 81b outside the range of the base station 80. However, a communications network 90 which is formed from a plurality of individual subscribers 83, 84, 85, 87, 88, 89, is disposed within the range of the mobile station 81b and the base station 80. Several of these subscribers 83, 84, 85 in this context form a first virtual antenna array 82. The subscribers 87, 88, 89 form a second virtual antenna array 86. The transmission from the base station 80 leads first to the first virtual antenna array 82, then to the second antenna array 86 and further to the mobile station 81b. During the measurement, a change is therefore implemented from the direct link of the base station 80 to the mobile station 81a, to a link with two intermediate steps via the two antenna arrays 82, 86 to the mobile station 81b.

Accordingly, as shown with reference to FIGS. 3-6, the device under test can be both a subscriber 83, 84, 85, 87, 88, 89 of one of the virtual antenna arrays 82, 86, and also only a subscriber 80, 81a, 81b linked to the latter. The other components of the communications network are formed by the measuring device. If the device under test is a subscriber of an antenna array, a link transferred from a base station or mobile station to the antenna array and a link transferred in the reverse direction can, among others, be monitored. A link transferred from a virtual antenna array 82 to a further virtual antenna array 86 can also be monitored.

If the device under test is a mobile station which is not a part of a virtual antenna array, a link transferred from a base station to a virtual antenna array and a link transferred in the reverse direction can, among others, be monitored. In particular, in this context, the behaviour of the device under test can be monitored during the reconfiguration from a subscriber of a virtual antenna array to a mobile station or base station which is not a part of a virtual antenna array. The measuring system in FIG. 7 can contain both one virtual antenna array and also several virtual antenna arrays.

Figure 8:
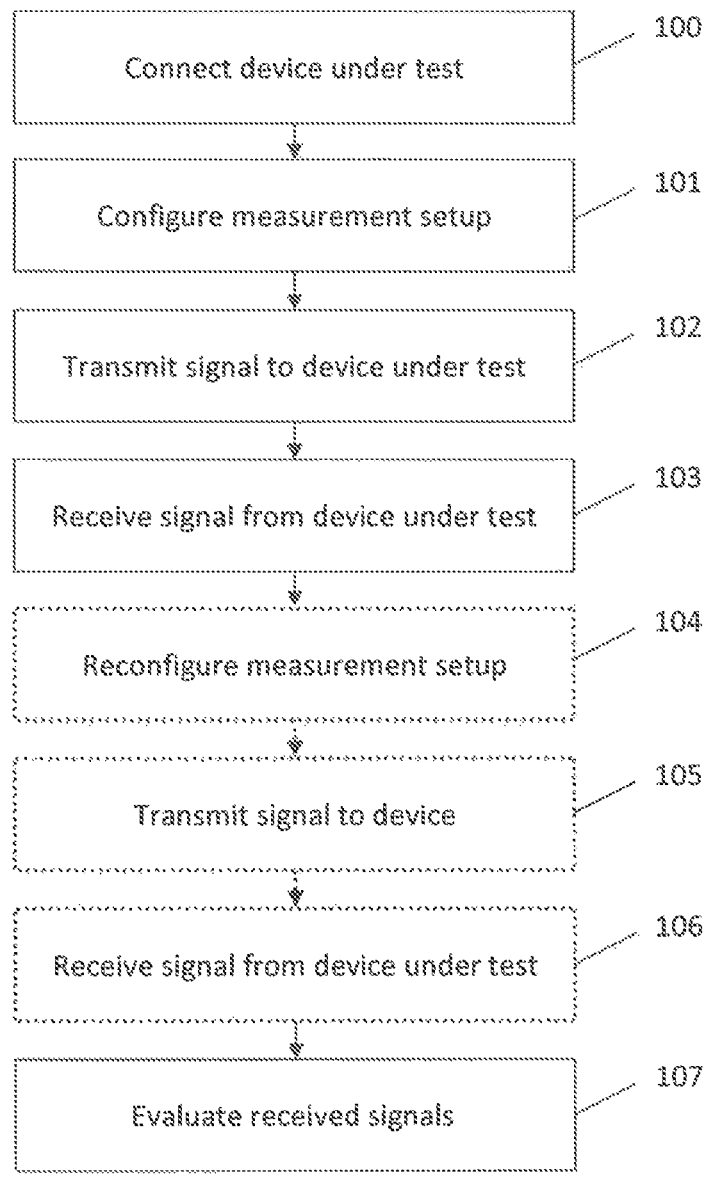
FIG. 8 shows an exemplary embodiment of the measuring method according to the invention.

FIG. 8 shows an exemplary embodiment of the measuring method according to the invention. In a first step 100, the device under test is connected to the measurement setup. In a second step 101, the measurement setup is configured. In this context, the individual components of the communications network, which transmit signals to the device under test and receive signals from the device under test are linked to one another and tuned to the device under test. In the third step 102, signals are transmitted to the device under test. In a fourth step 103, signals are received from the device under test through the measurement setup.

In an optional fifth step 104, a reconfiguration of the measurement setup is implemented. This step is implemented if a link transfer, as described with reference to FIG. 7, is to be monitored. In an optional sixth step 105, signals are again transmitted to the device under test. In an optional seventh step 106, signals are again received from the device under test.

In an eighth step 107 to be implemented continuously, the received signals are compared with the transmitted signals and criteria from which the capability of the device under test can be read off, are determined from this. With regard to these criteria, reference is made to the deliberations on FIG. 4.

The invention is not restricted to the exemplary embodiment presented here. Accordingly, different communications methods between the individual subscribers can be used. For example, GSM, UMTS, W-LAN, LTE, WiMax etc. can be used side-by-side. All of the features described above or illustrated in the drawings can be advantageously combined with one another as required within the framework of the invention.

The invention claimed is:

1. A measuring system for measuring a device under test with comprising: a first subscriber, a second subscriber, a first virtual antenna array and a processing device,
   wherein the device under test is a mobile station,
   wherein the first virtual antenna array comprises at least two mobile stations,
   wherein the first virtual antenna array contains the device under test,
   wherein the first subscriber is arranged in such a manner that it transmits signals to the first virtual antenna array,
   wherein the first virtual antenna array is arranged in such a manner that it transmits signals, at least indirectly, to the second subscriber, and
   wherein the processing device is formed in such a manner that it compares signals transmitted to the device under test and transmitted from the device under test.

2. The measuring system according to claim 1,
   wherein
   the first subscriber is a base station, and the second subscriber is a mobile station, or
   that the first subscriber is a mobile station and the second subscriber is a base station.

3. The measuring system according to claim 1,
   wherein
   the first virtual antenna array is connected to a second virtual antenna array,
   that the first virtual antenna array is arranged in such a manner that it transmits signals to the second virtual antenna array, and
   that the second virtual antenna array is arranged in such a manner that it transmits signals to the second subscriber.

4. The measuring system according to claim 3,
   wherein
   the first virtual antenna array and/or the second virtual antenna array is formed in such a manner, that an existing communications link from a virtual antenna array or a subscriber to the device under test can be transferred to a further virtual antenna array or a further subscriber, and
   that the processing device measures the behavior of the device under test during the transfer.

5. The measuring system according claim 1,
   wherein
   the measuring system further includes at least one channel-simulation device,
   that the channel-simulation device simulates an at least partially real transmission channel at least on a signal transmission path between two subscribers or between a virtual antenna array and a subscriber or between two virtual antenna arrays.

6. The measuring system according to claim 1,
   wherein during an existing communications link from a component of the first virtual antenna array to a mobile station or base station which is not a component of a virtual antenna array, the device under test is reconfigured, and that the processing device measures the behavior of the device under test during the reconfiguration.

7. The measuring system according to claim 1,
wherein
the device under test comprises at least two antennas,
that the device under test receives or transmits identical or different signals by means of its at least two antennas, and
that the control device monitors the reception or the transmission of the signals.

8. A measuring system for measuring a device under test comprising: a virtual antenna array and a processing device,
wherein the virtual antenna array comprises at least two mobile stations,
wherein the device under test is a mobile station or a base station,
wherein the virtual antenna array is arranged in such a manner that it transmits signals to the device under test and/or receives signals from the device under test, and
wherein the processing device is designed in such a manner that it compares the signals transmitted to the device under test and transmitted from the device under test.

9. The measuring system according to claim 8,
wherein
the virtual antenna array is embodied in such a manner that an existing communications link from a virtual antenna array or a subscriber to the device under test can be transferred to a further virtual antenna array or to a further subscriber,
and
that the processing device measures the behavior of the device under test during the transfer.

10. The measuring system according to claim 8,
wherein
the measuring device further includes at least one channel-simulation device,
that the channel-simulation device simulates an at least partially real transmission channel at least on one signal transmission path between two subscribers or between a virtual antenna array and a subscriber or between two virtual antenna arrays.

11. The measuring system according to claim 8,
wherein
during an existing communications link from a mobile station or base station which is not a component of a virtual antenna array, the device under test is reconfigured into a component of a virtual antenna array, and
that the processing device measures the behavior of the device under test during the reconfiguration.

12. The measuring system according to claim 8,
wherein
the device under test comprises at least two antennas,
that the device under test receives or transmits identical or different signals by means of its two antennas, and
that the control device monitors the reception or transmission of the signals.

13. A measuring method for measuring a device under test, wherein the device under test is a mobile station, the measuring method comprising:
transmitting signals to a first virtual antenna array, wherein the first virtual antenna array includes at least two mobile stations and the device under test;
at least indirectly transmitting signals from the first virtual antenna array, and
comparing signals transmitted to the device under test and transmitted from the device under test.

14. The measuring method according to claim 13,
further comprising
transmitting signals from the first virtual antenna array to a second virtual antenna array.

15. The measuring method according to claim 13,
further comprising
transferring an existing communications link from a virtual antenna array or a subscriber to the device under test to a further virtual antenna array or a further subscriber,
wherein the behavior of the device under test is measured during the transfer.

16. The measuring method according to claim 13,
wherein
simulating an at least partially real transmission channel is simulated at least on a signal transmission path between two subscribers or between a virtual antenna array and a subscriber or between two virtual antenna arrays.

17. The measuring method according to claim 13,
further comprising
during an existing communications link from a component of the first virtual antenna array to a mobile station or base station which is not a component of a virtual antenna array, reconfiguring the device under,
wherein the behavior of the device under test is measured during the reconfiguration.

18. The measuring method according to claim 13,
wherein
the device under test comprises at least two antennas,
that identical or different signals are received or transmitted via the at least two antennas of the device under test, and
that the reception or the transmission of the signals is monitored.

19. A measuring method for measuring a device under test, comprising:
transmitting signals from a virtual antenna array to a device under test and/or signals from the device under test are received by the virtual antenna array, wherein a virtual antenna array includes at least two mobile stations and the device under test is a mobile station or a base station, and
comparing signals transmitted to the device under test and transmitted from the device under test.

20. The measuring method according to claim 19,
further comprising
transferring an existing communications link from a virtual antenna array or a subscriber to the device under test to a further virtual antenna array or to a further subscriber,
wherein the behavior of the device under test is measured during the transfer.

21. The measuring method according to claim 19,
further comprising
simulating an at least partially real transmission channel at least on a signal transmission path between two subscribers or between a virtual antenna array and a subscriber or between two virtual antenna arrays.

22. The measuring method according to claim 19,
further comprising
during an existing communications link from a mobile station or base station which is not a component of a virtual antenna array to a component of a virtual antenna array, reconfiguring the device under test, wherein the behavior of the device under test is measured during the reconfiguration.

23. The measuring method according to claim 19, wherein the device under test comprises at least two antennas, that identical or different signals are received or transmitted by the device under test by means of its two antennas, and that the reception or the transmission of the signals is monitored.

* * * * *

UNITED STATES PATENT AND TRADEMARK OFFICE
CERTIFICATE OF CORRECTION

PATENT NO. : 8,818,289 B2
APPLICATION NO. : 13/522286
DATED : August 26, 2014
INVENTOR(S) : A. Schumacher It is certified that error appears in the above-identified patent and that said Letters Patent is hereby corrected as shown below:

In the Claims

| COLUMN | LINE(S) | ERROR |
|---|---|---|
| 8 | 16-17 | "test with comprising" should read --test comprising-- |

Signed and Sealed this
Thirty-first Day of March, 2015

Michelle K. Lee
*Director of the United States Patent and Trademark Office*